E. S. HALL.
HOSE COUPLING.
APPLICATION FILED MAY 21, 1910.
989,251.
Patented Apr. 11, 1911.
2 SHEETS—SHEET 2.
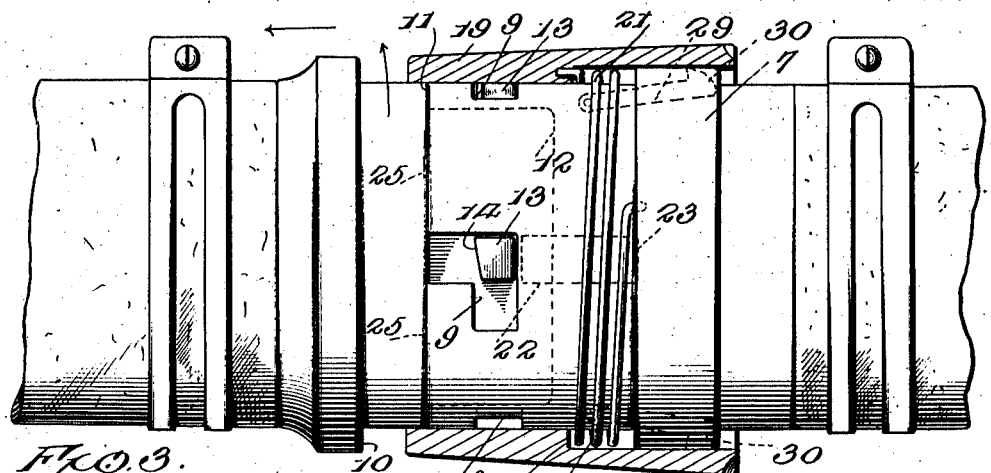
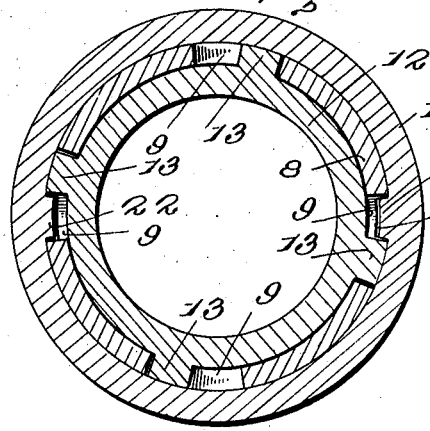
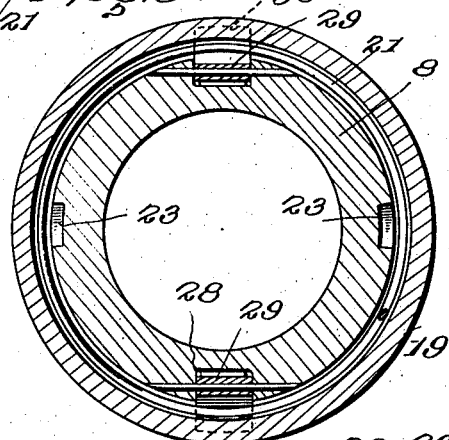
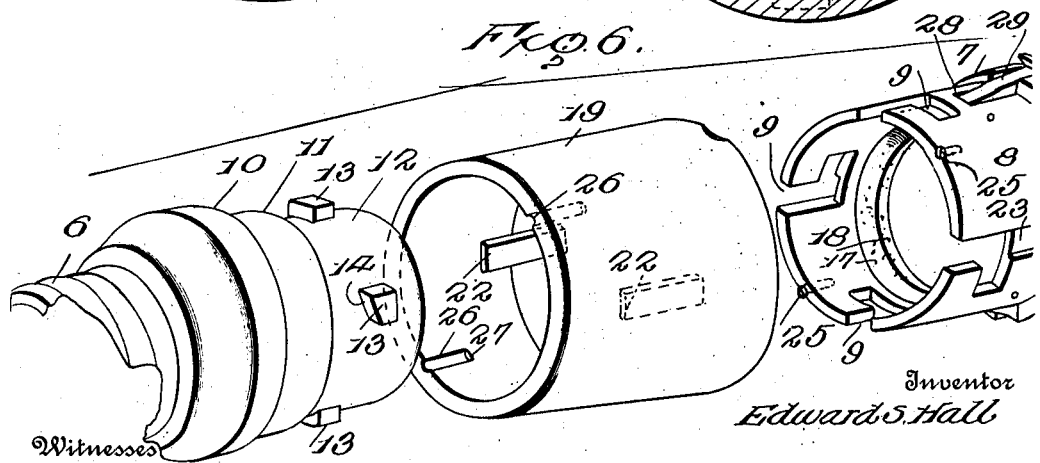
Inventor
Edward S. Hall

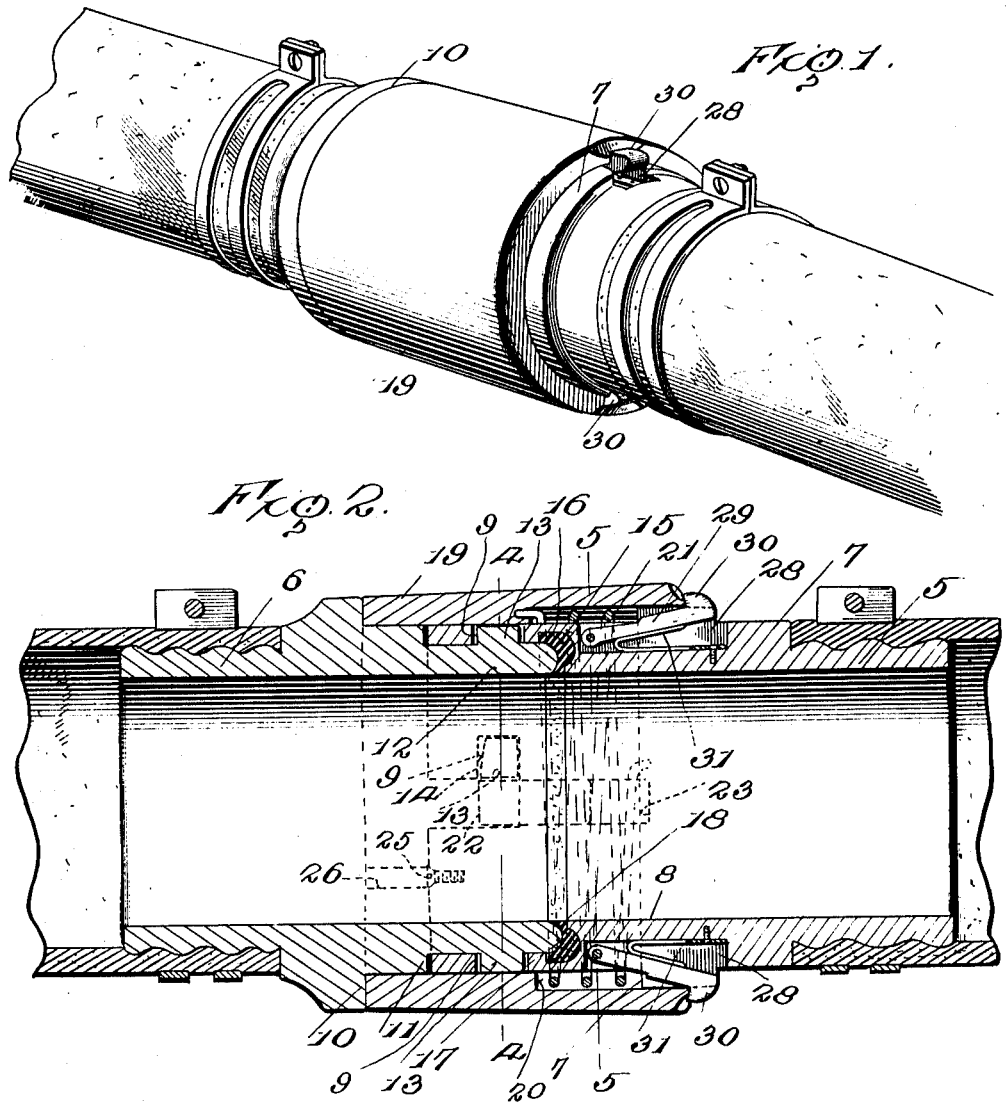

UNITED STATES PATENT OFFICE.

EDWARD S. HALL, OF ARCADE, NEW YORK.

HOSE-COUPLING.

989,251.  Specification of Letters Patent.  Patented Apr. 11, 1911.

Application filed May 21, 1910. Serial No. 562,706.

*To all whom it may concern:*

Be it known that I, EDWARD S. HALL, citizen of the United States, residing at Arcade, in the county of Wyoming and State of New York, have invented certain new and useful Improvements in Hose-Couplings, of which the following is a specification.

This invention relates to hose couplings and has for its object the provision of a strong, durable and thoroughly efficient device of this character, the construction of which is such that adjacent pipe or hose sections may be quickly united without the employment of the usual coupling threads.

A further object is to provide a coupling including mating sections, one of which is formed with bayonet slots and the other with spaced lugs adapted to enter said slots.

A further object is to provide a spring pressed sleeve or collar slidably mounted on one of the hose sections and provided with locking plates adapted to close the entrance to some of the bayonet slots after the lugs on the mating section have been inserted therein, thus to lock said hose sections in engagement with each other.

A further object is to provide means for limiting the rearward longitudinal movement of the sliding collar, and means for automatically locking said collar in extended or operative position.

A further object is to provide a novel form of gasket for preventing leakage at the junction of the hose sections.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a perspective view of a hose coupling constructed in accordance with my invention; Fig. 2 is a longitudinal sectional view of the same; Fig. 3 is a side elevation partly in section, showing the spring collar retracted and the lugs drawn from the bayonet slots preparatory to detaching the hose sections; Fig. 4 is a transverse sectional view taken on the line 4—4 of Fig. 2; Fig. 5 is a transverse sectional view taken on the line 5—5 of Fig. 2; Fig. 6 is a perspective view of the hose sections and collar separated.

Corresponding and like parts are referred to in the following description and indicated in all the views of the drawings by the same reference characters.

The improved coupler forming the subject matter of the present invention comprises mating sections 5 and 6, one of which is provided with a circumferential reinforcing rib 7 defining a cylindrical extension 8, there being a plurality of spaced bayonet slots 9 formed in the extension 8 and opening through the free end thereof, as shown.

The mating hose section 6 is formed with stepped shoulders 10 and 11 defining a reduced nipple 12 adapted to enter a recess in the cylindrical extension 8 of the mating hose section when said sections are coupled. Extending laterally from the exterior wall of the nipple 12, are spaced lugs 13 adapted to enter the adjacent bayonet slots 9, the outer faces of said lugs being inclined or beveled at 14 so as to permit the lugs to readily enter the slots 9 without binding or wedging action between the parts.

The extension 8 of the coupling section 5 is provided with a concaved shoulder 15 in which is seated a correspondingly shaped gasket or washer 16, which latter bears against the free end of the nipple 12 and serves to prevent leakage at the junction of said sections when the latter are coupled. The exposed face of the gasket 16 is preferably formed with a concaved seat 17 adapted to receive the convex terminal of the nipple 12, while the inner edge of the gasket is formed with a reduced lip 18, the face of which is disposed flush with the inner wall of the nipple 12.

Slidably mounted on the section 5, is a coupling sleeve or collar 19 having an interior shoulder 20, which forms an abutment for one end of a coil spring 21, the opposite end of said coil spring being anchored in any suitable manner on the reinforcing rib 7.

Secured to the inner wall of the collar or sleeve 19 are oppositely disposed locking plates 22 which extend across the mouths of the adjacent bayonet slots 9 and serve to retain the locking lugs 13 within the same. The locking plates 22 are seated in recesses 23 formed in the exterior wall of the cylindrical member 8, said recesses intersecting the adjacent bayonet slots 9 so that when the collar 19 is retracted, the plates 22 will also be retracted and thus permit the lugs 13 on the mating section to be removed from the bayonet slots when it is desired to detach the hose sections.

Secured to the free end of the extension 8 are pins or similar devices 25, the heads of which extend laterally beyond the exterior wall of the extension 8 and are slidably mounted in grooves 26 formed in the inner face of the collar 19, the heads of the pins 25, by engagement with the ends 27 of the grooves 26, serving to limit the rearward movement of said collar.

The exterior walls of the hose section 5 are formed with oppositely disposed seating recesses 28, which latter intersect the rib 7 and in which are pivotally mounted spring locking members 29. The locking members 29 are provided with terminal catches or finger pieces 30 normally held in contact with the adjacent end of the collar 19 by flat springs 31.

To couple the hose sections, the finger pieces or catches 30 are pressed inwardly against the tension of the springs 31, after which the section 6 is introduced within the extension of the section 5, and a longitudinal pressure applied to the section 6 which causes the lugs 13 to bear against the adjacent ends of the locking plates 22 and move the collar rearwardly so as to expose the mouths of the adjacent bayonet slots and thus permit said lugs to enter the slots by partially rotating the section 6.

When the lugs 13 are seated in the bayonet slots 9, the tension of the spring 21 will move the collar 19 to extended or operative position, thereby causing the locking plates 22 to close the mouths of said slots and effectually lock the sections in coupled position. In order to release the sections, the finger pieces 30 are pressed inwardly and the collar 19 moved rearwardly, thus withdrawing the locking plates 22 from the bayonet slots so that by partially rotating the section 6, the lugs 13 may be disengaged from said bayonet slots and thus permit the withdrawal of the section 6 from the mating section 5.

It will of course be understood that the section 5 may be provided with any number of bayonet slots, and that in some cases a locking plate may be employed for each slot, without departing from the spirit of the invention.

Having thus described the invention, what is claimed as new is:

1. A coupling including mating sections, one of which is provided with spaced bayonet slots, a plurality of lugs extending laterally from the mating section and adapted to enter said slots, a collar disposed at the junction of said sections and slidably mounted on one of said sections, locking members carried by the collar and adapted to extend across the mouths of the adjacent bayonet slots, and means carried by one of the hose sections and adapted to engage the adjacent end of the collar for preventing rearward sliding movement thereof.

2. A coupling including mating sections, one of which is provided with an extension having spaced bayonet slots formed therein and opening through the free end of said section, lugs extending laterally from the mating section and adapted to enter the bayonet slots, a collar slidably mounted on one of the sections and provided with locking members adapted to form a closure for the mouths of some of the bayonet slots, and means carried by the slotted section and adapted to engage the adjacent end of the collar for preventing rearward movement thereof.

3. A coupling including mating sections, one of which is provided with a reinforcing rib and spaced bayonet slots, lugs extending laterally from the mating section and adapted to enter said bayonet slots, a collar having an interior shoulder and provided with oppositely disposed plates forming closures for the mouths of the adjacent bayonet slots, a spring interposed between the rib and shoulder on the collar, and locking members carried by the slotted hose section and adapted to engage the adjacent end of the collar.

4. A coupling including mating sections, one of which is provided with a reinforcing rib defining an extension having spaced bayonet slots formed therein and opening through the free end of the extension, there being seated recesses formed in the exterior wall of the extension and intersecting the adjacent bayonet slots, lugs extending laterally from the mating section and adapted to enter the bayonet slots, a collar having an interior stop shoulder and provided with locking plates slidably mounted in the seating recesses and normally closing the mouths of the adjacent bayonet slots, a spring having one end thereof bearing against the stop shoulder on the collar and its other end engaging the reinforcing rib, and locking members pivotally mounted on one of the hose sections and provided with terminal catches engaging the adjacent end of the collar.

5. A coupling including mating sections, one of which is provided with an extension having spaced bayonet slots formed therein and opening through the free end of the extension, there being longitudinally disposed seating recesses formed in the exterior wall of the extension and intersecting the adjacent bayonet slots, the mating section being provided with stepped shoulders defining a reduced nipple adapted to enter the extension of the mating section, lugs extending laterally from the nipple for engagement with the bayonet slots, a collar slidably mounted on one of the sections and provided with locking plates engaging the seating recesses and adapted to close the mouths of the adjacent bayonet slots, a spring interposed between the collar and one of the hose sections for normally holding the locking plates in operative position and locking members carried by the slotted hose section and adapted to engage the adjacent end of the collar.

6. A coupling including mating sections, one of which is provided with spaced bayonet slots and longitudinal seating recesses intersecting said slots, lugs extending laterally from the mating sections and adapted to enter the bayonet slots, a collar slidably mounted on one of the sections and provided with interior grooves, locking plates secured to the inner wall of the collar and slidably mounted in the seating recesses for normally closing the mouths of the adjacent bayonet slots, pins secured to one of the hose sections between the bayonet slots and engaging the seating grooves in the collar and locking members pivotally mounted on the slotted hose section and adapted to engage the adjacent end of said collar.

7. A coupling including mating sections, one of which is formed with bayonet slots and the other with laterally extending lugs adapted to enter the bayonet slots, a collar slidably mounted on the slotted section and provided with locking plates forming closures for the mouths of the adjacent bayonet slots, means for normally and yieldably holding the collar in extended position, said collar being retracted when the mating section is inserted in the slotted section and the lugs on said mating section forced into engagement with the adjacent ends of the locking plates, and locking members carried by the slotted hose section and adapted to engage the collar.

In testimony whereof, I affix my signature in presence of two witnesses.

EDWARD S. HALL. [L. S.]

Witnesses:
   D. C. BENTLEY,
   D. H. HICKS.